US008284479B2

(12) United States Patent  
Akasaka et al.

(10) Patent No.: US 8,284,479 B2  
(45) Date of Patent: Oct. 9, 2012

(54) OPTICAL AMPLIFIER CARD WITH PLUGGABLE PUMP LASER MODULES

(75) Inventors: Youichi Akasaka, Allen, TX (US); Takao Naito, Plano, TX (US)

(73) Assignee: Fujitsu Limited, Kawasaki-shi (JP)

( * ) Notice: Subject to any disclaimer, the term of this patent is extended or adjusted under 35 U.S.C. 154(b) by 524 days.

(21) Appl. No.: 12/543,415

(22) Filed: Aug. 18, 2009

(65) Prior Publication Data

US 2011/0043897 A1  Feb. 24, 2011

(51) Int. Cl.  
*H04B 10/17* (2006.01)  
*H04B 10/12* (2006.01)

(52) U.S. Cl. .................................. 359/341.3; 359/341.33

(58) Field of Classification Search ............... 359/341.3, 359/341.33  
See application file for complete search history.

(56) References Cited

U.S. PATENT DOCUMENTS

| | | | | |
|---|---|---|---|---|
| 5,173,957 A * | 12/1992 | Bergano et al. | ................. | 385/24 |
| 5,594,748 A * | 1/1997 | Jabr | ........................... | 372/38.09 |
| 5,761,234 A * | 6/1998 | Craig et al. | ..................... | 372/75 |
| 6,132,104 A * | 10/2000 | Bliss et al. | ....................... | 385/53 |
| 6,636,345 B2 * | 10/2003 | Hempstead | .............. | 359/341.32 |
| 6,793,399 B1 * | 9/2004 | Nguyen | ........................... | 385/53 |
| 6,839,163 B1 * | 1/2005 | Jakobson et al. | .......... | 359/341.1 |
| 6,967,769 B2 * | 11/2005 | Badr et al. | ............... | 359/341.32 |

* cited by examiner

*Primary Examiner* — Eric Bolda  
(74) *Attorney, Agent, or Firm* — Baker Botts L.L.P.

(57) ABSTRACT

A system for optical communication including an optical amplifier card configured to receive a plurality of pump laser modules. The optical amplifier card includes a receptacle configured to receive the pump laser module, a connector configured to couple the pump laser module to the optical amplifier card, a monitor configured to measure at least the optical output power of the pump laser module, and a pump combiner communicatively coupled to the monitor. The pump combiner is configured to receive a signal from the monitor indicating a drop in the output power of a first pump laser module below a threshold level, and, in response to the signal, switch the optical amplifier card from using the optical power of the first pump laser module to using the optical power of a second pump laser module without substantially affecting normal operation of the optical amplifier card.

10 Claims, 3 Drawing Sheets

OPTICAL AMPLIFIER CARD WITH PLUGGABLE PUMP LASER MODULES

TECHNICAL FIELD

This invention relates generally to the field of optical communication networks and more specifically to optical amplifier cards.

BACKGROUND

A communication network includes paths of nodes that route packets through the network. Optical amplifiers perform an important function within these networks by amplifying an optical signal in order to increase the operational length of an optical network. From time to time, the pump lasers that may form a key part of the optical amplifier may experience faults, resulting in an unacceptable level of output power on the part of the optical amplifier. Currently, pump lasers are expensive and difficult to manufacture, due to the high performance specifications required. These pump lasers may also be difficult to replace, particularly in submarine communication networks.

SUMMARY OF THE DISCLOSURE

In accordance with the present invention, disadvantages and problems associated with previous techniques for operating an optical amplifier may be reduced or eliminated.

According to one embodiment of the present invention, a system for optical communication comprises an optical amplifier card configured to receive a plurality of pump laser modules. The optical amplifier card comprises a plurality of receptacles, each configured to receive a pluggable pump laser module, a connector positioned in each receptacle and configured to couple the pluggable pump laser module to the optical amplifier card, a monitor configured to measure at least the optical output power of the pluggable pump laser modules, a pump combiner communicatively coupled to the monitor and configured to combine the optical output power of the pluggable pump laser modules, and a controller communicatively coupled to the monitor and the pluggable pump laser modules. The controller is configured to receive a signal from the monitor indicating a drop in the output power of a first pump laser module below a threshold level, and, in response to the signal, send an activation signal to a second pluggable pump laser module without substantially affecting normal operation of the optical amplifier card.

Certain embodiments of the invention may provide one or more technical advantages. A technical advantage of one embodiment may be that implementing multiple, redundant, low-cost pump laser modules rather than a single, high-performance pump laser in an optical amplifier allows optical amplifiers to be built and implemented more cheaply. Another advantage may be that creating pluggable pump laser modules rather than integrated pump lasers reduces the time, effort, and cost associated with the maintenance of optical amplifier cards. In some embodiments, an optical amplifier card may switch from one pump laser module to another upon failure of the first pump laser without substantially affecting normal performance. Such failover may also allow an optical amplifier to combine the output power of multiple pump laser modules when needed to produce a greater output power than is normally required, or in order to combine multiple low-performing pump lasers to reach normal output power.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 4 of the drawings, like numerals being used for like and corresponding parts of the various drawings.

Figure 1:
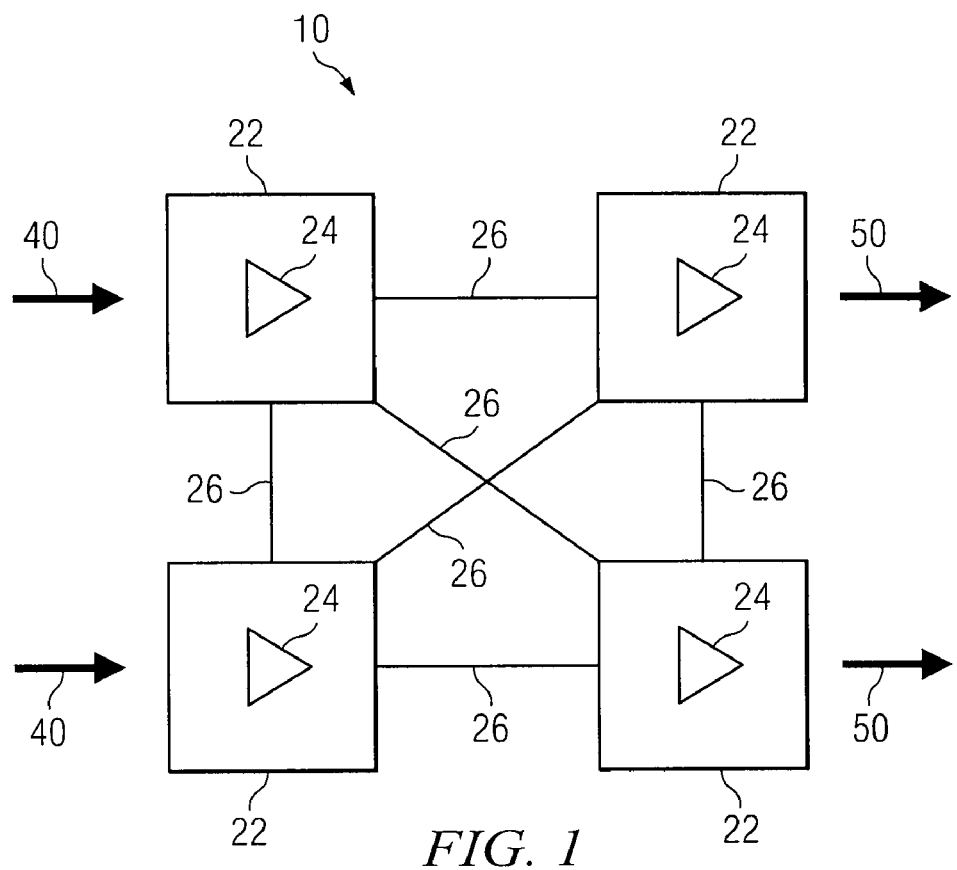
FIG. 1 illustrates an optical communication network system, in accordance with certain embodiments of the present disclosure.

FIG. 1 illustrates an optical communication network system, in accordance with certain embodiments of the present disclosure Optical network system 10 includes components such as network nodes. In general, a network node may include any suitable arrangement of components operable to perform the operations of the network node. As an example, a network node may include logic, an interface, memory, other component, or any suitable combination of the preceding. "Logic" may refer to hardware, software, other logic, or any suitable combination of the preceding. Certain logic may manage the operation of a device, and may comprise, for example, a processor. "Processor" may refer to any suitable device operable to execute instructions and manipulate data to perform operations.

"Interface" may refer to logic of a network node operable to receive input for the network node, send output from the network node, perform suitable processing of the input or output or both, or any combination of the preceding, and may comprise one or more ports, conversion software, or both.

"Memory" may refer to logic operable to store and facilitate retrieval of information, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

Network system 10 communicates information through signals. A signal may refer to an optical signal transmitted as light pulses. As an example, an optical signal may have a frequency of approximately 1550 nanometers and a data rate of 10, 20, 40, or over 40 gigabits per second. A signal may alternatively refer to an electrical signal.

According to the illustrated embodiment, network system 10 may include one or more networks. A network may include nodes 22 coupled by fibers 26 in a mesh topology as shown in FIG. 1 or any other suitable topology, such as a liner or ring topology.

A node 22 may include any suitable devices. According to the illustrated embodiment, a node 22 includes an optical amplifier 24. An optical amplifier 24 may include any suitable device operable to amplify a portion of an optical input signal 40 received at node 22 before signal 40 leaves node 22, including amplification between stages of communication within node 22. Amplification may result in an optical output signal 50 with a magnitude greater than that of optical input signal 40. Examples of optical amplifier 24 include doped fiber amplifiers, semiconductor laser optical amplifiers, or other device operable to amplify an optical signal. In the illustrated embodiment, optical amplifier 24 is an Erbium Doped Fiber Amplifier (EDFA) housed within an optical amplifier card. The optical amplifier card is coupled to other components of node 22 via an electrical or optical communication structure, such as a backplane.

The performance of optical amplifier 24 may be largely dependent on the performance of its component pump laser. When the pump laser fails, optical amplifier 24 may cease to perform its necessary function. Current implementations of network system 10 may use high-performance pump laser(s) without redundancy in each optical amplifier 24. Such pump lasers are often designed to last as long as twenty years. Such pump lasers are often highly pruned and expensive to both manufacture and implement. Additionally, current implementations of network system 10 may be installed in situations, such as submarine implementations, where replacement of an entire optical amplifier 24 due to failure of the pump laser is impractical or expensive.

In some embodiments, optical amplifier 24 comprises multiple, redundant, low-cost, lower-performance pump lasers rather than a single, high-performance pump laser, as described below with reference to FIGS. 2 through 3.

Modifications, additions, or omissions may be made to network system 10 without departing from the scope of the invention. The components of network system 10 may be integrated or separated according to particular needs. Moreover, the operations of network system 10 may be performed by more, fewer, or other devices. Additionally, operations of network system 10 may be performed using any suitable logic. As used in this document, "each" refers to each member of a set or each member of a subset of a set.

Figure 2:
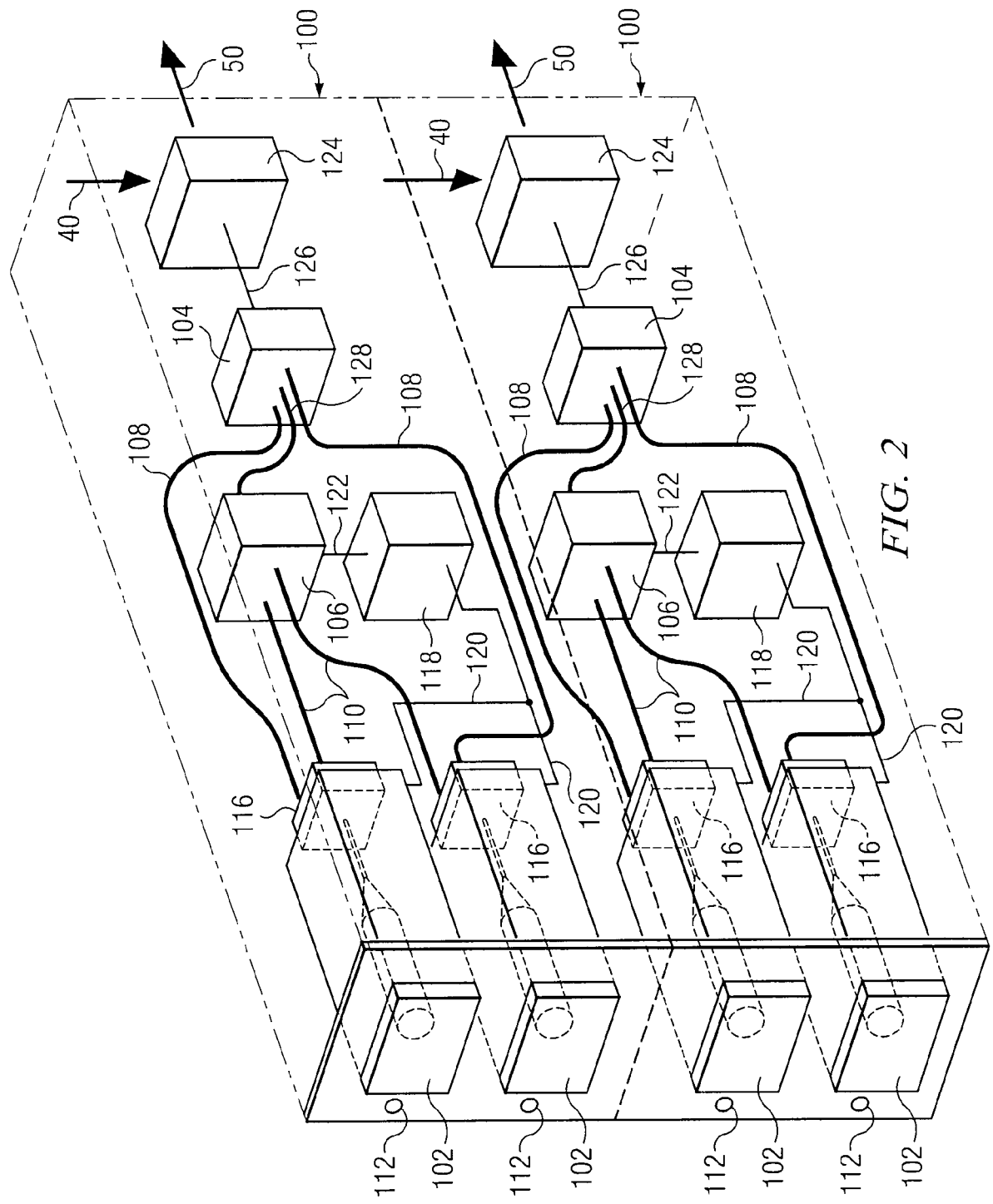
FIG. 2 illustrates an optical amplifier card, in accordance with certain embodiments of the present disclosure.

FIG. 2 illustrates an optical amplifier card 24 that may be used with network system 10 of FIG. 1, in accordance with certain embodiments of the present disclosure. In some embodiments, node 22 may comprise a card shelf with multiple cards performing different functions. One such function may be the amplification of optical signals, which may be performed by optical amplifier card 24. Optical amplifier card 24 may contain one or more optical amplifiers 100 for amplifying different input signals. For clarity, FIG. 2 depicts two optical amplifiers 100 within optical amplifier card 24. However, embodiments may include one or more optical amplifier(s) 100 within optical amplifier card 24.

In some embodiments, optical amplifier card 24 includes a plurality of receptacles configured to receive pluggable pump laser modules 102. These receptacles may be configured to provide ease of installation and removal of pump laser modules 102. Each receptacle may have a connector 116 positioned within the receptacle to couple pluggable pump laser module 102 to optical amplifier card 24. Connector 116 may be any appropriate optical or electrical connector, e.g., a Standard Connector ("SC"), a Ferrule connector ("FP"), or a Local connector ("LC"). Pump laser modules 102 are described in more detail below with reference to FIG. 3.

Each optical amplifier 100 may, in some embodiments, include a plurality of pluggable pump laser modules 102, a pump combiner 104, a monitor 106, and a controller 118. Pump laser module(s) 102 may be communicatively coupled to pump combiner 104 via communication path 108, communicatively coupled to monitor 106 via communication path 110, and communicatively coupled to controller 118 via communication path 120. Controller 118 may be communicatively coupled to monitor 106 via communication path 122. In some embodiments, the communication paths may be optical waveguides on a circuit board to which all of the optical components are attached. Monitor 106 may be configured to measure at least the optical output power of pump laser modules 102. Monitor 106 may be communicatively coupled to pump combiner 104 via communication path 128. In some embodiments, monitor 106 may be a photodiode or other appropriate hardware configured to measure at least the optical output power of pump laser modules 102. For clarity of description, FIG. 2 depicts each optical amplifier 100 with its own monitor 106. However, optical amplifier card 24 may be configured to have one or more monitor(s) 106. For additional clarity of description, FIG. 2 depicts pump laser module 102 as communicatively coupled to monitor 106 and pump combiner 104 via separate communication paths 110 and 108, respectively. In some embodiments, pump laser module 102 may only have a single optical output, in which case it may be necessary to use an optical splitter to provide communication paths 110 and 108.

If the optical output power of a pump laser module 102 falls below a certain threshold level, the pump laser may no longer be desirable for use in optical amplifier card 24. Monitor 106 may be configured to send a signal to controller 118 via communication path 122 indicating that the optical output power of one or more pump laser module(s) 102 has fallen below the threshold level.

Controller 118 may be configured to receive the signal from monitor 106. Controller 118 may be, in some embodiments, a software program stored on computer-readable media and executable by a processor. For clarity of description FIG. 2 depicts controller 118 as a separate module. In some embodiments, controller 118 may be a stand-alone software program. However, controller 118 may also be a component or subroutine of a larger software program, such as the operating system, or may be hard-coded into computer-readable media, firmware stored on computer-readable media, and/or any hardware or software module configured to measure at least the optical output power of pump laser modules 102. Controller 118 may be further configured to send an activation and/or deactivation signal to pluggable pump laser module(s) 102 via communication path 120. Communication path 120 may, in some embodiments, be an electrical control communication path coupling controller 118 and pluggable pump laser module(s) 102.

Pluggable pump laser modules 102 may be further configured to receive a signal from controller 118 via communication path 120 indicating that pluggable pump laser modules 102 should turn on or turn off. For example, a failed (or failing) pump laser module 102 may be turned off and a backup pump laser module 102 may be turned on. Alternatively, the backup pump laser module 102 may be turned on and the failing, but still operating, pump laser module 102 may be left on for some period. Pump combiner 104 may be configured to combine the optical output power of one or more pluggable pump laser modules 102 such that the optical output power of the functioning pluggable pump laser module 102 is passed on to the remainder of optical amplifier 100 without substantially affecting normal operation of optical amplifier card 24. Pump combiner 104 may be any hardware module configured to combine the optical output power of one or more pump laser(s), e.g., a polarization beam combiner or wavelength-division multiplexer.

In operation, when monitor 106 measures the optical output power of a first pump laser module 102 and that power is below a threshold level, controller 118 indicates to the first, failing pluggable pump laser module 102 that it should turn off, and indicates to a second, backup pluggable pump laser module 102 that it should turn on. Pump combiner 104 may combine the output power of the first pump laser module 102 with the second pump laser module 102 in order to reestablish an optical output power above the threshold level. This optical power may then be used to amplify an incoming signal to a greater optical strength. In some embodiments, pump combiner 104 may be communicatively coupled to amplifier 124 via communication path 126. Pump combiner 104 may pass the combined optical output of pump laser modules 102 to amplifier 124. In some embodiments, optical input signal 40 and the optical output of pump combiner 104 may be multiplexed into a doped fiber at amplifier 124 to generate optical output signal 50. In an appropriately functioning optical amplifier 24, optical output signal 50 will have a greater magnitude than optical input signal 40.

Optical amplifier card 24 may also include one or more failure indicator(s) 112. Failure indicator 112 may be configured to indicate to a system user, via an indicator such as an LED, that the associated pump laser module 102 has an optical output power level that is below a threshold level. Each pump laser module 102 may have an associated failure indicator 112. In some embodiments, controller 118 may be configured to turn on failure indicator(s) 112 to indicate that pump laser module 102 has failed. In some embodiments, failure indicator 112 may indicate to a repair person or engineer that one or more pump laser modules 102. The repair person or engineer may then remove the indicated pluggable pump laser module 102 and replace it with a new pluggable pump laser module 102. Controller 118 may also communicate a failure indication or alarm to a node management system that controls node 22 and/or a network management system. The pump laser modules 102 are described below with reference to FIG. 3.

Figure 3:
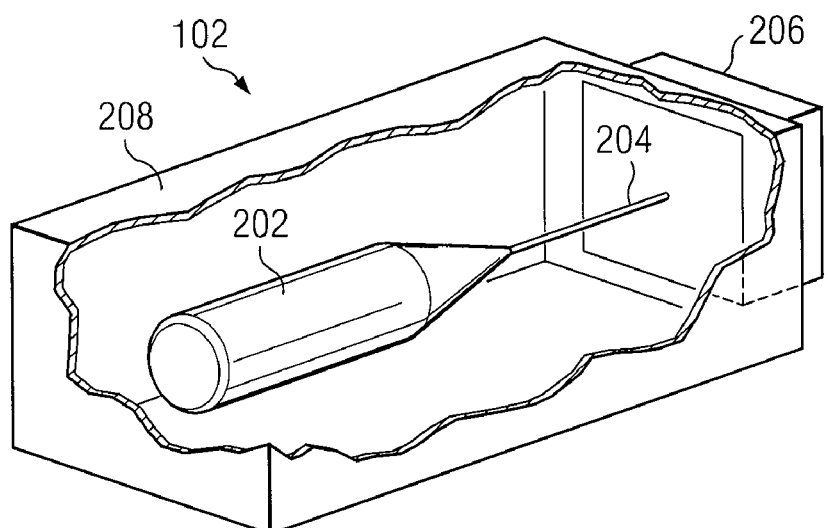
FIG. 3 illustrates a pump laser module, in accordance with certain embodiments of the present disclosure.

FIG. 3 illustrates a pump laser module 102 configured for use in optical amplifier card 24, in accordance with certain embodiments of the present disclosure. Pump laser module 102 may, in some embodiments, include a housing 208, a connector 206, and a pump laser 202 substantially enclosed within housing 208 and communicatively coupled to connector 206 via communication path 204, such as a waveguide.

Housing 208 of pump laser module 102 may be configured to be removable from optical amplifier card 24. Housing 208 may be made of metal, plastic, or any other material suitable for use in the particular implementation of optical amplifier 24 in network system 10. As described above in more detail with reference to FIG. 2, pump laser module 102 may be configured to be easily removable from optical amplifier card 24 in order to facilitate replacement of a pump laser within optical amplifier card 24. Pump laser module 102 may be referred to as "pluggable," to indicate that pump laser module 102 is easily inserted and removed into optical amplifier card 24 without removing optical amplifier card 24 from its associated node 22.

In some embodiments, housing 208 of pump laser module 102 also contains pump laser 202 and connector 206 communicatively coupled to pump laser 202 via communication path 204. Connector 206 may be any appropriate optical or electrical connector configured to communicatively couple pump laser module 102 to optical amplifier card 24 via connector 116 of optical amplifier card 24. Connector 206 may be any appropriate optical or electrical connector, e.g., a Standard Connector ("SC"), a Ferrule connector ("FC"), or Local connector ("LC"). Generally, connector 206 and connector 116 will be of the same type in order to facilitate communication between pump laser module 102 and optical amplifier card 24. Pump laser 202 may be any appropriate source of optical energy configured to supply optical power to optical amplifier 24, such as a laser diode (as an example only, a diode with output power of 300 mW configured to produce laser light at wavelengths between 1425 and 1510 nm). However, pump laser 202 may produce optical power at high or lower power levels and wavelengths, and may be any source of optical power configured to operate with optical amplifier card 24.

In operation, pump laser 202 may supply light at a given wavelength or band of wavelengths to connector 206 via communication path 204. Connector 206 passes the energy to optical amplifier 24 via connector 116. Optical amplifier 24 may then use the energy from pump laser 202 in combination with an incoming optical signal in order to amplify the signal for further propagation within communication system 10.

Figure 4:
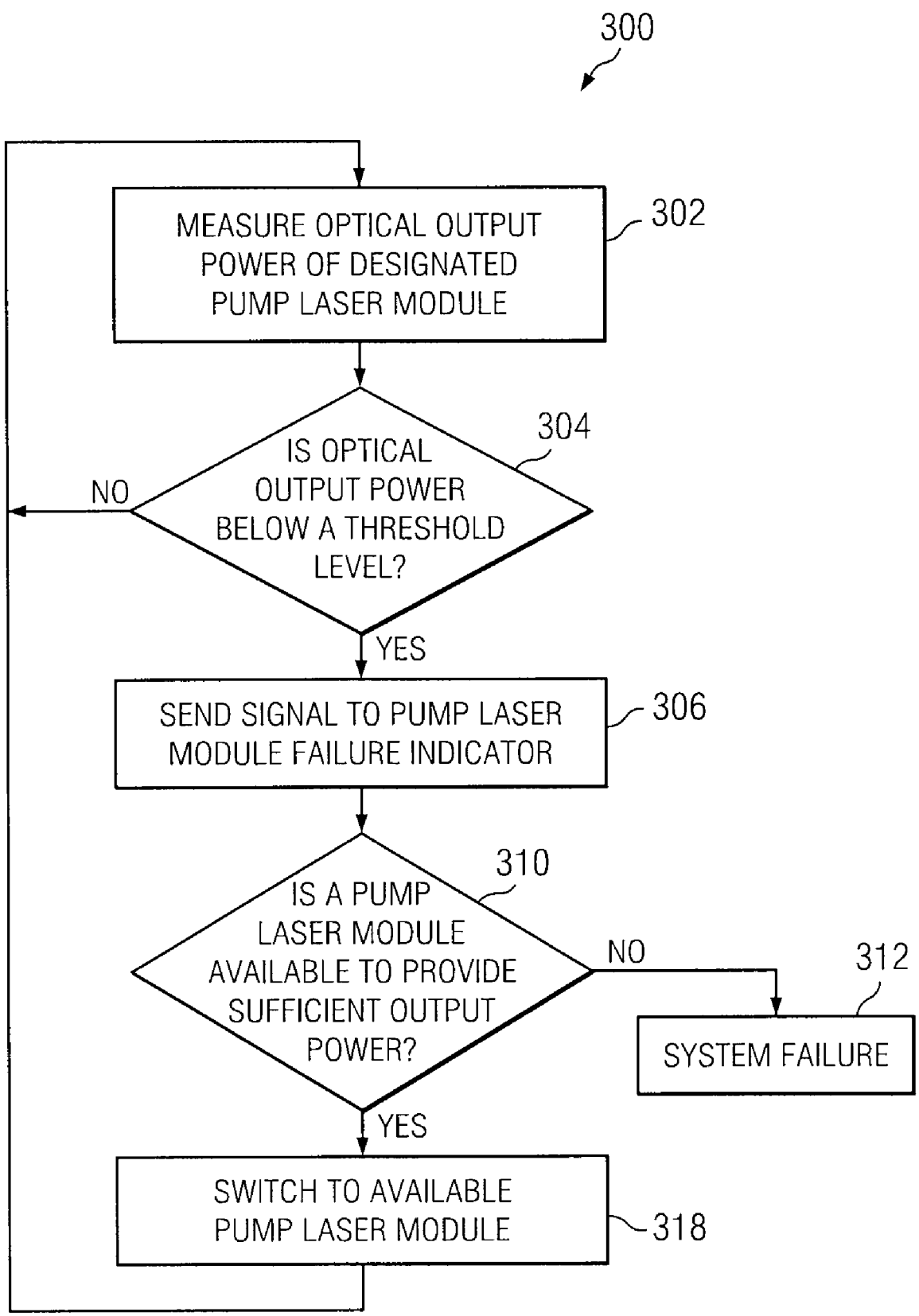
FIG. 4 is a flowchart illustrating one embodiment of a method of operating an optical amplifier card that may be used with the optical amplifier card of FIG. 1.

FIG. 4 is a flowchart illustrating one embodiment of a method 300 of operating the optical amplifier card 24 that may be used with the optical amplifier card of FIG. 1. Method 300 includes monitoring at least an optical output power of a first pump laser module 102, recognizing when the optical output power of the first pump laser module falls below a critical level, and switch over to a second pump laser module 102 without substantially altering normal operating conditions of optical amplifier card 24.

According to one embodiment, method 300 preferably beings at step 302. Teachings of the present disclosure may be implemented in a variety of configurations of optical amplifier cards and communication systems. As such, the preferred initialization point for method 300 and the order of steps 302-318 comprising method 300 may depend on the implementation chosen.

At step 302, monitor 106 of optical amplifier card 24 may measure the optical output power of a designated pump laser module 102 of optical amplifier card 24 (i.e., the primary pump laser module 102). Monitor 106 is described in more detail above with reference to FIGS. 2-3. At step 304, monitor 106 compares the measured output power to a predetermined threshold level. If the measured value is above the threshold level (indicating that the pump laser module 102 is operating with sufficient optical power), then no action may need to be taken and method 300 returns to step 302. If the measured value is below the threshold level, then method 300 proceeds to step 306.

At step 306, controller 118 may send a signal, such as an alarm and/or a power on signal to failure indicator 112 of optical amplifier card 24, indicating that the primary pump laser module 102 has insufficient power to operate optical amplifier 100. Such a signal would allow a user responsible for maintenance of optical amplifier card 24 to replace failed pump laser module 102 without substantially affecting the normal operation of optical amplifier 100. Once the signal has been sent, method 300 may proceed to step 310.

At step 310, optical amplifier card 24 may determine if a second pump laser module 102 of optical amplifier card 24 is available to provide sufficient optical output power by itself. For instance, optical amplifier card 24 may determine if there is an available, fully functioning backup pump laser module 102. If such a backup pump laser module 102 is available, then method 300 may proceed to step 312, wherein controller 118 may send a signal to backup pump laser module 102 to turn on and a signal to failing pump laser module 102 to turn off. Alternatively, the combined optical output power of failing pump laser module 102 and backup pump laser module 102 may be combined at pump combiner 104 of optical amplifier card 24 to provide sufficient operating power for optical amplifier 100. After this switch, method 300 may then proceed to step 302. If such a pump laser module 102 is not available, then method 300 may proceed to step 318, indicating a system failure.

Although FIG. 4 discloses a particular number of steps to be taken with respect to method 300, method 300 may be executed with more or fewer steps than those depicted in FIG. 4. In addition, although FIG. 4 discloses a certain order of steps comprising method 300, the steps comprising method 400 may be completed in any suitable order. For example, in the embodiment of method 300 shown, controller 118 may send a signal to failure indicator 112 indicating that the primary pump laser module 102 has insufficient optical output power. However, for cost or other reasons, a particular implementation may not include this step.

Certain embodiments of the invention may provide one or more technical advantages. A technical advantage of one embodiment may be that lower cost pump lasers may be used in an optical amplifier card rather than a high-cost, high-durability pump laser. Under the methods and systems disclosed herein, using multiple, pluggable low cost pump laser modules and managing the failure of those modules may reduce design and manufacturing costs of optical amplifiers, as well as reducing associated maintenance costs.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A system for optical communication, comprising:
an optical amplifier card configured to receive a plurality of pluggable pump laser modules, comprising:
 a plurality of receptacles, each configured to receive a pluggable pump laser module;
 a connector positioned in each receptacle and configured to couple the pluggable pump laser module to the optical amplifier card;
 a monitor configured to measure at least the optical output power of the pluggable pump laser modules;
 a pump combiner communicatively coupled to the monitor, configured to combine the optical output power of the pluggable pump laser modules; and
 a controller communicatively coupled to the monitor and the pluggable pump laser modules, configured to:
  receive a signal from the monitor indicating a drop in the output power of a first pluggable pump laser module below a threshold level; and
  in response to the signal, send an activation signal to a second pluggable pump laser module without substantially affecting normal operation of the optical amplifier card.

2. The system of claim 1, wherein the controller is further configured to send a deactivation signal to the first pluggable pump laser module in response to the signal.

3. The system of claim 1, further comprising a pump laser module failure indicator associated with each pluggable pump laser module, wherein the controller is further operable to activate an indicator when the output power of an associated pluggable pump laser module drops below the threshold level.

4. The system of claim 1, wherein the connector comprises an SC connector.

5. The system of claim 1, wherein the connector comprises an FC connector.

6. The system of claim 1, wherein the connector comprises an LC connector.

7. A method of operating an optical amplifier card coupled to a first and second pluggable pump laser modules, comprising:
monitoring at least an optical output power of the first pluggable pump laser module;
determining that the optical output power of the first pluggable pump laser module has fallen below a critical level;
sending an activation signal to the second pluggable pump laser module to effect a switching over to the second pluggable pump laser module without substantially altering normal operating conditions of the optical amplifier card; and
removing the first pluggable pump laser module without substantially altering normal operating conditions of the optical amplifier card.

8. The method of claim 7, further comprising replacing the first pump laser module without substantially altering the normal operating conditions of the optical amplifier card.

9. The method of claim 7, further comprising switching over to the replacement first pump laser module without substantially altering normal operating conditions of the optical amplifier card.

10. The method of claim 7, further comprising sending a signal indicating failure of the first pluggable pump laser module to a user responsible for maintenance of the optical amplifier.

* * * * *